(12) United States Patent
Yamazaki et al.

(10) Patent No.: US 7,445,071 B2
(45) Date of Patent: Nov. 4, 2008

(54) ELECTRONIC THROTTLE CONTROL AND CRUISE CONTROL FOR HANDLE BAR TYPE VEHICLE

(75) Inventors: Ryutaro Yamazaki, Saitama (JP); Seizo Tamura, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 207 days.

(21) Appl. No.: 11/581,764

(22) Filed: Oct. 16, 2006

(65) Prior Publication Data

US 2007/0084658 A1    Apr. 19, 2007

(30) Foreign Application Priority Data

Oct. 18, 2005    (JP)    ............... 2005-303314

(51) Int. Cl.
*B62K 11/00*    (2006.01)
(52) U.S. Cl. .................. 180/219; 74/551.9; 180/170; 180/171; 180/176; 180/179
(58) Field of Classification Search ............... 180/219, 180/179, 171, 170, 176; 74/551.9
See application file for complete search history.

(56) References Cited

U.S. PATENT DOCUMENTS

| | | | | |
|---|---|---|---|---|
| 3,982,446 A | * | 9/1976 | Van Dyken | 74/488 |
| 4,796,716 A | * | 1/1989 | Masuda | 180/176 |
| 4,848,502 A | * | 7/1989 | Kikuta et al. | 180/179 |
| 4,966,247 A | * | 10/1990 | Masuda | 180/171 |
| 5,893,295 A | * | 4/1999 | Bronnert | 74/488 |
| 6,135,227 A | * | 10/2000 | Laning | 180/170 |
| 6,250,173 B1 | * | 11/2001 | Huston | 74/489 |
| 6,318,490 B1 | * | 11/2001 | Laning | 180/170 |
| 6,473,684 B1 | * | 10/2002 | Shimamura et al. | 701/93 |
| 6,820,710 B2 | * | 11/2004 | Fechner | 180/170 |
| 6,978,694 B2 | * | 12/2005 | Peppard | 74/489 |
| 7,315,779 B1 | * | 1/2008 | Rioux et al. | 701/114 |
| 2007/0084657 A1 | * | 4/2007 | Abe et al. | 180/219 |

FOREIGN PATENT DOCUMENTS

JP    2001-246960    9/2001

* cited by examiner

*Primary Examiner*—Lynda Jasmin
*Assistant Examiner*—Patrick Centolanzi
(74) *Attorney, Agent, or Firm*—Carrier Blackman & Associates P.C.; William D. Blackman; Joseph P. Carrier

(57) ABSTRACT

A saddle type vehicle is provided in which a valve shaft for a throttle valve is rotatably supported on an air intake path forming body, and a valve shaft actuator is connected to an end of the valve shaft in such a way that the rotational movement of the valve shaft is fed back to the throttle grip, whereby it is not necessary to extend a cable between the between the valve shaft and the throttle grip, and the rotational movement of the valve shaft can be fed back to the throttle grip. A grip-driving electric motor, which is moved by the amount of movement according to the amount of rotation of the valve shaft in response to the operation of the actuator, is disposed on the steering handle, and is interlocked and connected to the throttle grip.

9 Claims, 7 Drawing Sheets

ELECTRONIC THROTTLE CONTROL AND CRUISE CONTROL FOR HANDLE BAR TYPE VEHICLE

CROSS-REFERENCE TO RELATED APPLICATIONS

The present invention claims priority under 35 USC 119 based on Japanese patent application No. 2005-303314, filed on Oct. 18, 2005. The subject matter of this priority document is incorporated by reference herein.

BACKGROUND OF THE INVENTION

1. Field of the Invention

The present invention relates to a saddle type vehicle that includes an air intake path forming body that forms an air intake path. A valve shaft is rotatably supported on the air intake path forming body. A butterfly-shaped throttle valve for controlling the opening of the air intake path is secured to the valve shaft. An actuator is connected to an end of the valve shaft so as to rotate the valve shaft. The actuator includes a valve shaft-driving electric motor, which is moved in response to the turning operation of a throttle grip rotatably mounted to an end of a bar-shaped steering handle. The actuator is connected to an end of the valve shaft in such a way that the rotational movement of the valve shaft is fed back to the throttle grip.

2. Description of the Background Art

In a saddle type vehicle such as a motorcycle, a known air intake control device includes a configuration in which a cable is wound around a throttle drum. The throttle drum is mounted to a valve shaft and is connected to a throttle grip so as to feed back the rotational movement of the valve shaft, the valve shaft driven to rotate by a valve shaft-driving electric motor. Such an air intake device is disclosed, for example, in JP-A-2001-246960.

According to the motorcycle disclosed in JP-A-2001-246960, it is necessary to provide a push-pull type cable, such as a Bowden cable, that extends between a throttle drum to be mounted to a valve shaft and a throttle grip.

In view of such circumstances, it is an object of the present invention to provide a saddle type vehicle in which provision of a push-pull cable between a throttle drum to be mounted to a valve shaft and a throttle grip is not necessary, and the rotational movement of a valve shaft, driven to rotate by a valve shaft-driving electric motor, can be fed back to a throttle grip.

SUMMARY

In order to achieve the object described above, a first aspect of the invention is directed to a saddle type vehicle that includes an air intake path forming body that forms an air intake path. A valve shaft is rotatably supported on the air intake path forming body. A butterfly-shaped throttle valve for controlling the opening of the air intake path is secured to the valve shaft. An actuator is connected to an end of the valve shaft so as to rotate the valve shaft. The actuator includes a valve shaft-driving electric motor, which is moved in response to the turning operation of a throttle grip rotatably mounted to an end of a bar-shaped steering handle. The actuator is connected to an end of the valve shaft in such a way that the rotational movement of the valve shaft is fed back to the throttle grip. The invention is characterized in that a grip-driving electric motor is disposed on the steering handle and is interlocked and connected to the throttle grip. The grip-driving electric motor is moved by the amount of movement according to the amount of rotation of the valve shaft, which rotates in response to the movement of the actuator.

According to the first aspect of the invention, since the throttle grip is driven to rotate by the grip-driving electric motor in response to the rotation of the valve shaft by a drive force provided by the valve shaft-driving electric motor, provision of a push-pull cable between a throttle drum to be mounted to a valve shaft and a throttle grip is not necessary.

In addition to the configuration of the invention according to the first aspect thereof, a second aspect of the invention is directed to an automatic cruise selection switch and a control unit. The automatic cruise selection switch permits switching between an automatic cruising state and a non automatic cruising state, and the control unit controls the movement of the valve shaft-driving electric motor so as to maintain a constant vehicle speed in response to selection of the automatic cruising state by the automatic cruise selection switch.

According to the second aspect of the invention, the saddle type vehicle can be operated at a constant vehicle speed by selecting the automatic cruising state and, in addition, the load state of an internal combustion engine during the automatic cruising can be recognized by the rotation of the throttle grip. Therefore, a desirable feeling of travel is obtained by the vehicle operator.

In addition to the configuration of the invention according to the second aspect thereof, a third aspect of the invention is directed to a rotating member that rotates coaxially with the throttle grip by transmission of power from the grip-driving electric motor. The rotating member is mounted to the steering handle so as to cause the throttle grip to follow the rotation of the rotating member. A cancel switch is mounted to the rotating member, the cancel switch detecting when the throttle grip is rotated in the throttle closing direction with respect to the rotating member. When the vehicle is operating in the automatic cruising state, the control unit releases the automatic cruising state in response to the detection by the cancel switch of the relative rotation of the throttle grip in the throttle closing direction.

According to the third aspect of the invention, the rotation of the throttle grip for releasing the automatic cruising state can be detected by the cancel switch in good response in a structure without the interposition of the push-pull cable or the like.

Modes for carrying out the present invention are explained below by reference to an embodiment of the present invention shown in the attached drawings. The above-mentioned object, other objects, characteristics and advantages of the present invention will become apparent form the detailed description of the embodiment of the invention presented below in conjunction with the attached drawings.

DETAILED DESCRIPTION

A selected illustrative embodiment of the invention will now be described in some detail, with reference to FIGS. 1-10. It should be understood that only structures considered necessary for clarifying the present invention are described herein. Other conventional structures, and those of ancillary and auxiliary components of the system, are assumed to be known and understood by those skilled in the art. In the following description of the saddle type vehicle of the illustrative embodiment, the vehicle is exemplified by a motorcycle.

Figure 1:
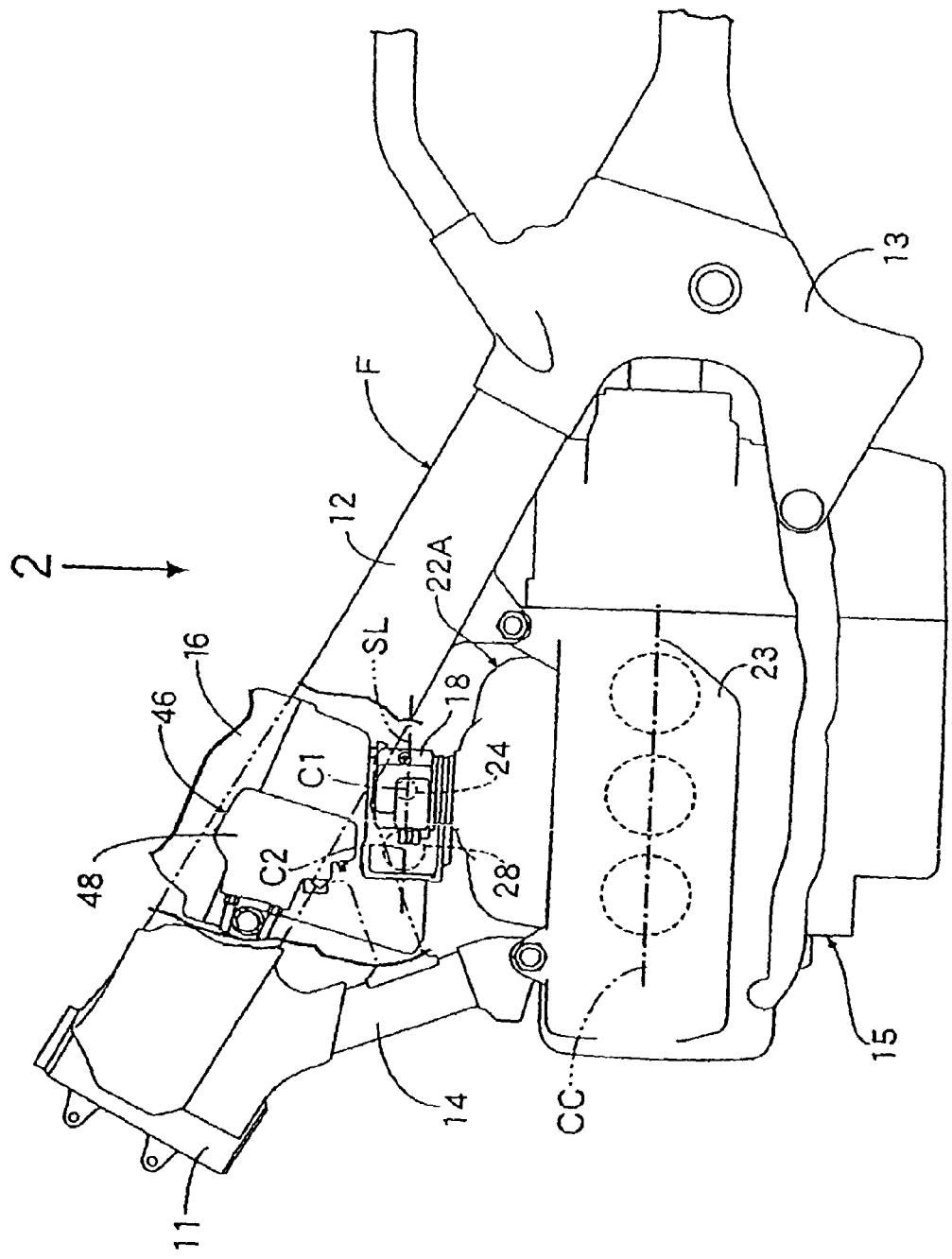
FIG. 1 is an isolated side view of a motorcycle body frame and an engine mounted thereon showing the intake air control device disposed above the engine and below the main frames.
Figure 2:
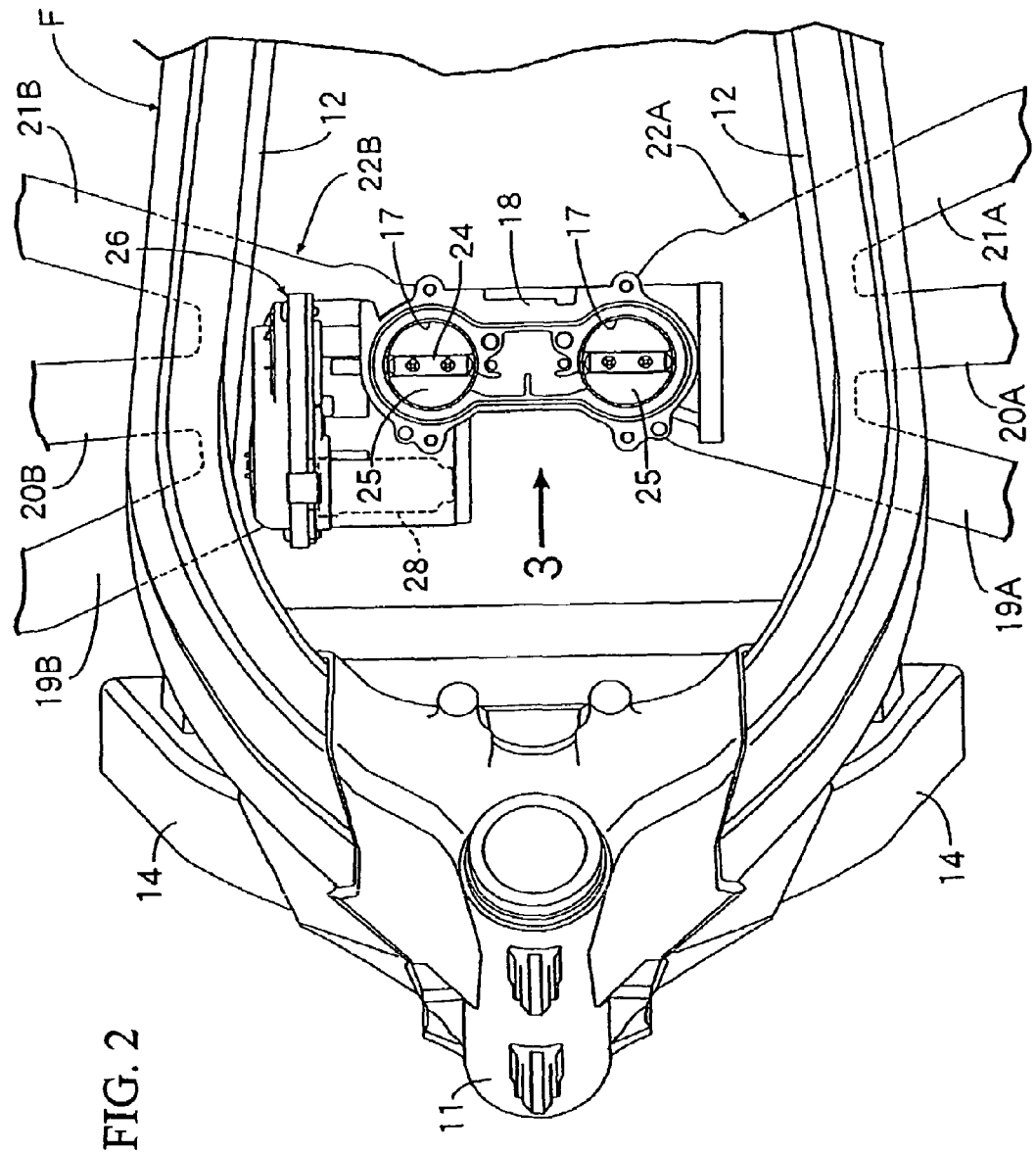
FIG. 2 is a plan view of the motorcycle body frame and the engine mounted thereon obtained by viewing in the direction indicated by an arrow 2 in FIG. 1, in a state in which an air cleaner is omitted, showing the intake air control device disposed between the left and right main frames.

In FIG. 1 and FIG. 2, a vehicle body frame F of the motorcycle includes a head pipe 11 at a front end thereof, and a pair of left and right main frames 12 bifurcated from the head pipe 11 to the left and right and obliquely extending rearward and downward. The vehicle body frame F also includes pivot plates 13 connected to rear portions of the both main frames 12, and down pipes 14 bifurcated to the left and right under the both main frames 12. The down pipes 14 are connected to the head pipe 11 and extend obliquely rearward and downward at an angle steeper than that of the main frames 12.

An engine body 15 is configured to include six horizontally opposed cylinders, including three cylinders arranged on both left and right sides, each set of three cylinders extending in the fore-and-aft direction of the motorcycle. The engine body 15 is mounted to the vehicle body frame F so as to be positioned below the main frames 12, and the engine body 15 is supported by a midsection of the main frames 12, the pivot plates 13 and the down pipes 14.

An air cleaner 16 is mounted to the vehicle body frame F at a position above the engine body 15. An air intake path forming body 18, which forms a pair of air intake paths 17, 17 arranged on the left and right direction of the vehicle body frame F, is arranged between the air cleaner 16 and the engine body 15. An upper portion of the air intake path forming body 18 is connected to a lower portion of the air cleaner 16 so that upstream ends of the both air intake paths 17 communicate with the interior of a purification chamber (not shown) in the air cleaner 16. An intake manifold 22A having three intake pipes 19A, 20A, 21A, which commonly communicate with one of downstream ends of the both air intake paths 17, and an intake manifold 22B having three intake pipes 19B, 20B, 21B, which commonly communicate with the other downstream end of the both air intake paths 17, are connected to a lower portion of the air intake path forming body 18. The respective intake pipes 19A to 21A, 19B to 21B provided by the intake manifolds 22A, 22B are connected to left and right cylinder heads 23 provided by the engine body 15.

Figure 3:
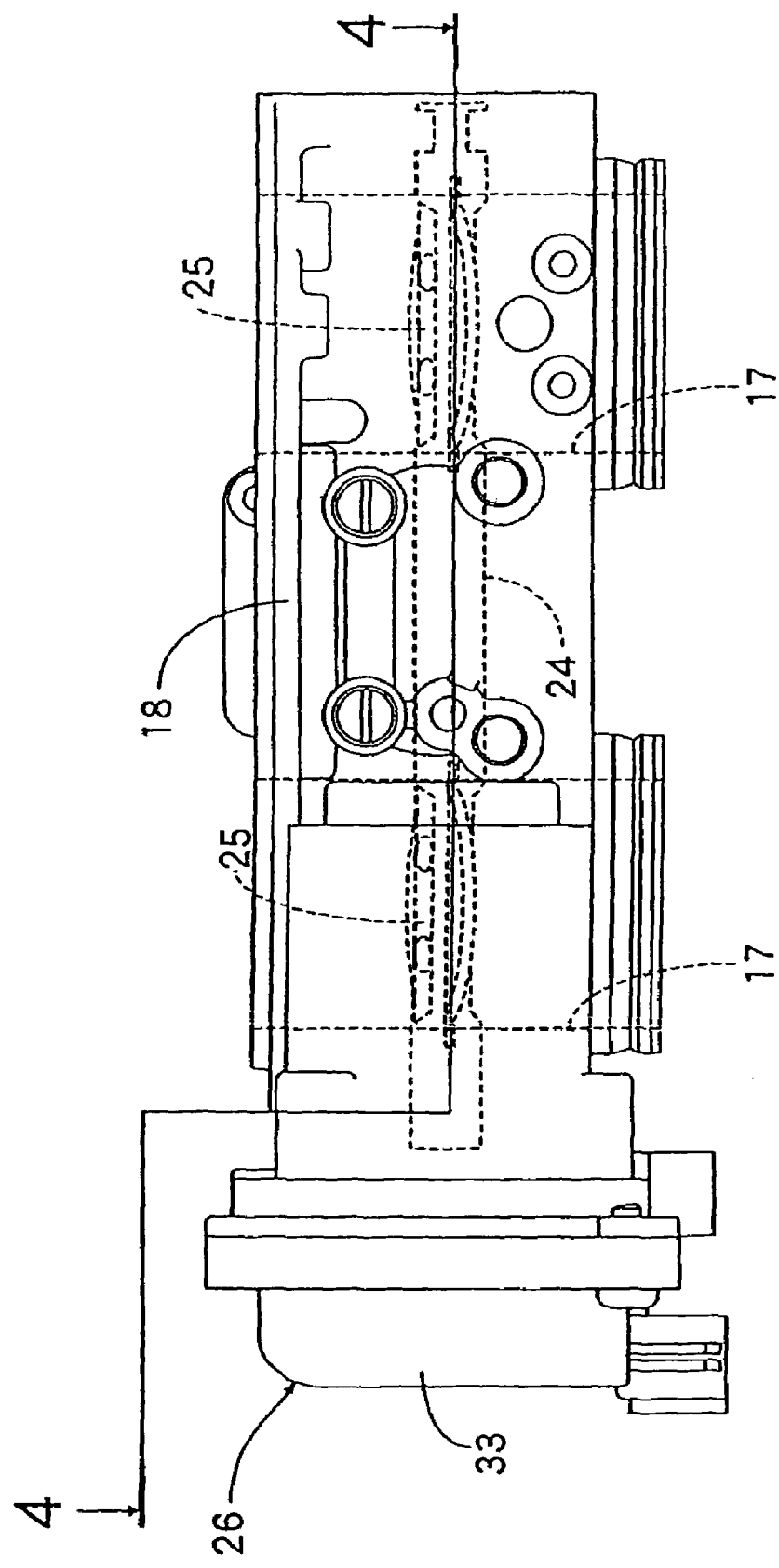
FIG. 3 is a side view of the intake air control device of FIG. 1.
Figure 4:
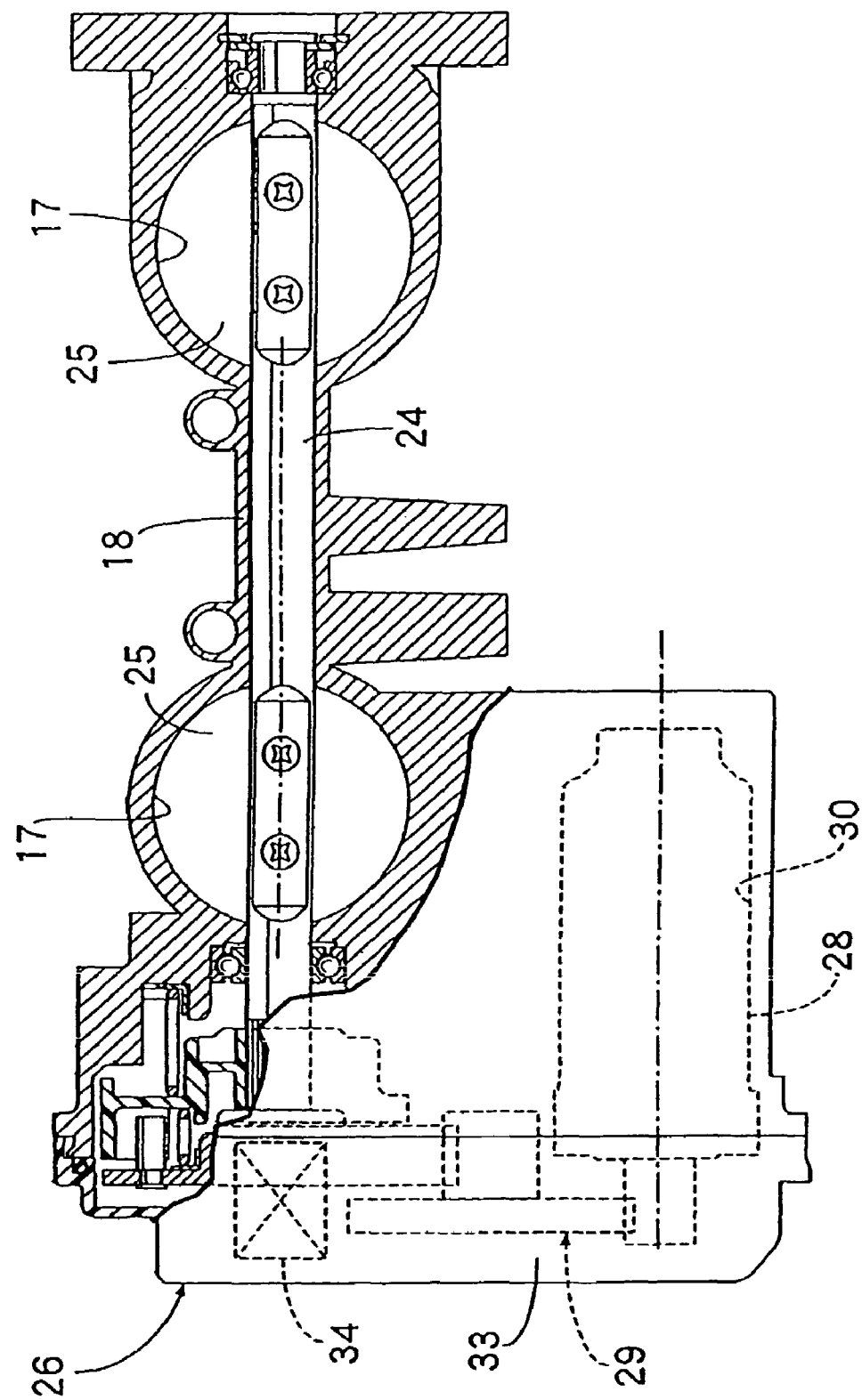
FIG. 4 is a plan view of the intake air control device of FIG. 1 obtained by viewing in the direction indicated by an arrow 4 in FIG. 3.

Referring also to FIG. 3 and FIG. 4, a valve shaft 24 extends in the left and right direction of the vehicle body frame F across the both air intake paths 17, 17, and is rotatably supported by the air intake path forming body 18. Butterfly-shaped throttle valves 25, 25 for controlling the opening of the both air intake paths 17 are fixed to the valve shaft 24. In addition, an actuator 26, which rotationally drives the valve shaft 24, is connected to an end of the valve shaft 24.

Referring specifically to FIG. 4, the actuator 26 includes a valve shaft-driving electric motor 28 having an axial line of rotation extending in parallel with an axial line of the valve shaft 24. The actuator 26 also includes a decelerating gear mechanism 29 for decelerating the rotational power of the valve shaft-driving electric motor 28, and transmitting the same to an end of the valve shaft 24. The valve shaft-driving electric motor 28 is stored and supported in a storage recess 30 provided in the air intake path forming body 18 such that an axis of rotation C2 thereof lies in parallel with the axial line C1 of the valve shaft 24. The air intake path forming body 18 is provided with a cover 33 for covering the actuator 26 mounted thereon. A throttle opening sensor 34 is stored in the cover 33 so that the throttle opening sensor 34, which detects the opening of the throttle valves 25, that is, the rotational position of the valve shaft 24, is connected to an end of the valve shaft 24.

The valve shaft-driving electric motor 28 is arranged between the main frames 12 in the vehicle body frame F when viewing the motorcycle from above as clearly shown in FIG. 2, and is arranged forwardly of the valve shaft 24 along the fore-and-aft direction of the motorcycle. The engine body 15 is mounted to the vehicle body frame F in an orientation in which a crank axial line CC extends along the fore-and-aft direction of the motorcycle. The axial line C1 of the valve shaft 24 and the axial line of rotation C2 of the valve shaft-driving electric motor 28 are arranged on an imaginary line SL arranged above the engine body 15, and the line SL is substantially parallel with the crank axial line CC when viewing the motorcycle from the lateral side (FIG. 1).

Figure 5:
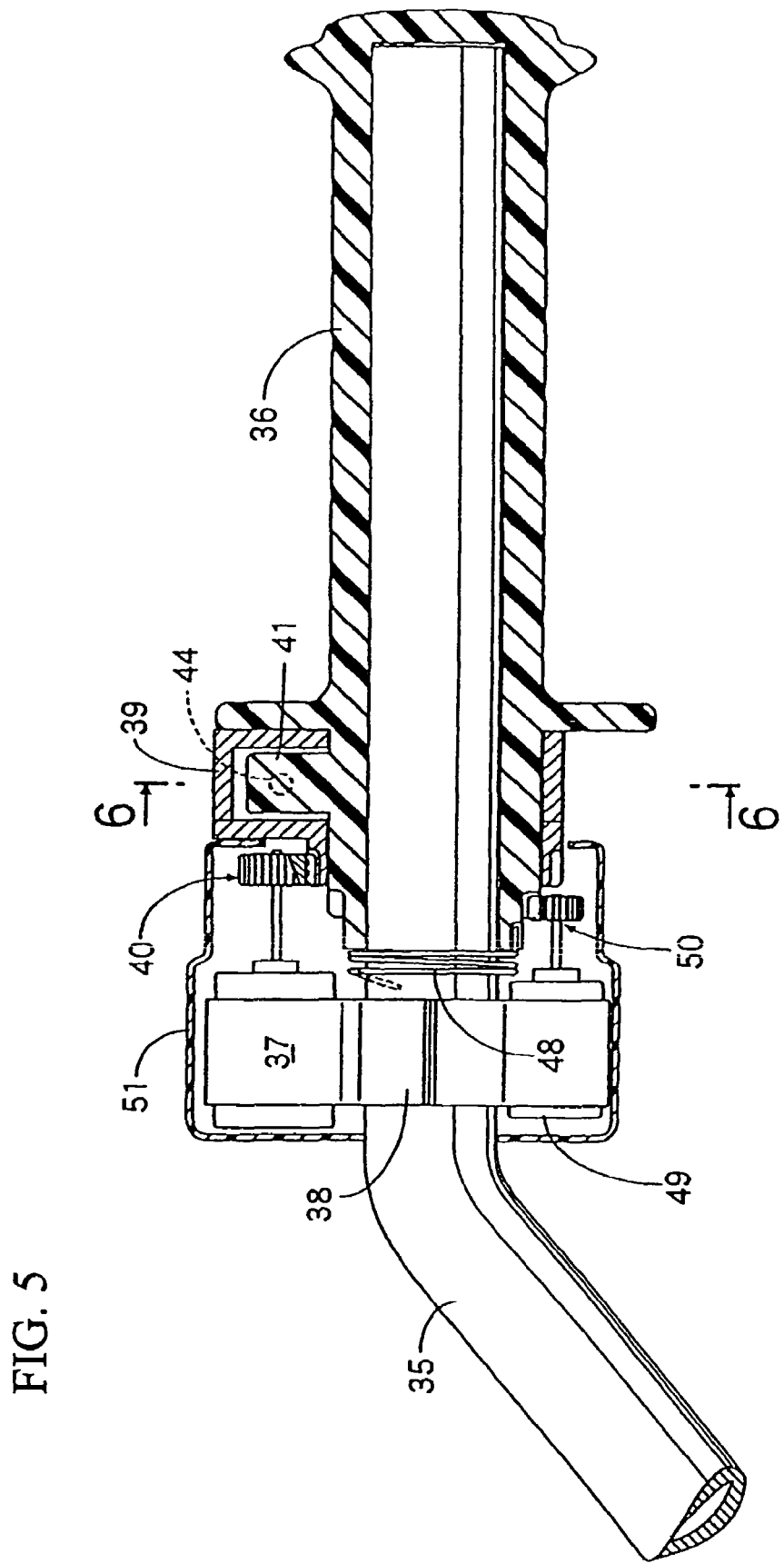
FIG. 5 is a vertical cross-sectional view of a steering handle of the motorcycle in the vicinity of a throttle grip.
Figure 6:
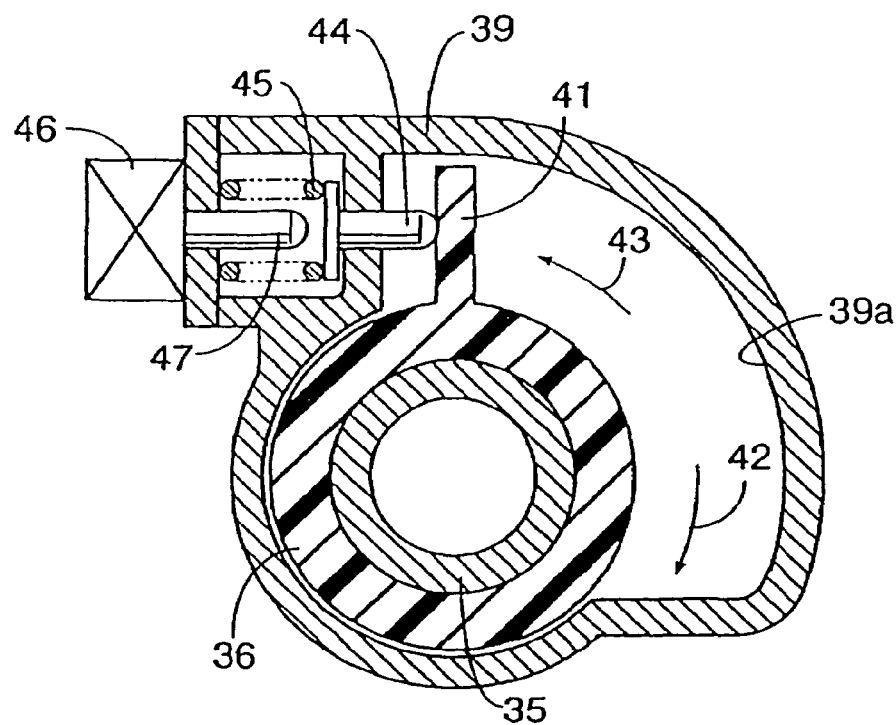
FIG. 6 is a cross-sectional view of the steering handle taken along the line 6-6 in FIG. 5.
Figure 7:
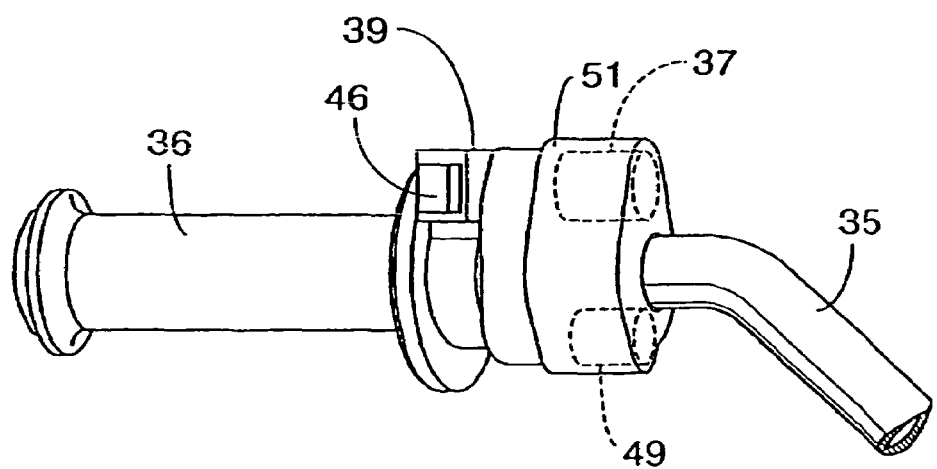
FIG. 7 is a perspective view of the steering handle as viewed from the front of the vehicle in the vicinity of the throttle grip.

In FIG. 5 to FIG. 7, a bar-shaped, right-side steering handle 35 is steerably supported by the head pipe 11 at the front end of the vehicle body frame F. A throttle grip 36 is mounted to a right end portion of the steering handle 35 so as to enable a vehicle operator to grip and rotate the throttle grip 36. In addition, in order to permit the rotational movement of the valve shaft 24, which is rotatably supported by the air intake path forming body 18, to be fed back to the throttle grip 36, a grip-driving electric motor 37 is disposed on the steering handle 35, and is interlocked and connected to the throttle grip 36. The grip-driving electric motor 37 is moved by the amount of rotation of the valve shaft 24, that is, according to a detected value of the throttle opening sensor 34.

The grip-driving electric motor 37 is mounted to the steering handle 35 by a mounting member 38 so as to have an axial line of rotation in parallel with an axial line of rotation of the throttle grip 36. On the other hand, a rotating frame 39 as a rotating member is mounted to the steering handle 35 so as to cover an inner end portion of the throttle grip 36, and be capable of rotating coaxially with the throttle grip 36, so that the rotational power of the grip-driving electric motor 37 is transmitted to the rotating frame 39 via a transmission gear mechanism 40. In other words, the grip-driving electric motor 37 is interlocked and connected to the rotating frame 39.

A return spring 48 (see FIG. 5), which urges the throttle grip 36 in the throttle closing direction indicated by an arrow 43 in FIG. 6, is provided between the throttle grip 36 and the steering handle 35. The throttle grip 36 is integrally provided with an arm portion 41 projecting in the radially outward direction within the rotating frame 39. A pressing piece 44 is movably mounted to the rotating frame 39. The pressing piece 44 can rotate the throttle grip 36 in the throttle opening direction indicated by an arrow 42 in FIG. 6 by coming into abutment with the arm portion 41. A lost motion spring 45, whose spring load is set to a value larger than that of the return spring 48, is provided between the rotating frame 39 and the pressing piece 44 in a compressed state. A recess 39a is provided on an inner surface of the rotating frame 39. The recess 39a allows the rotational movement of the arm portion 41 away from the pressing piece 44 when the throttle grip 36, in a state in which the arm portion 41 is in abutment with the pressing piece 44, is rotated in the throttle opening direction 42.

In this manner, when the rotating frame 39 is driven to rotate in the throttle opening direction 42 by the grip-driving electric motor 37 in a state in which an operating load is not applied to the throttle grip 36 by the vehicle operator, the arm portion 41 is pressed by the pressing piece 44, and the throttle grip 36 rotates in the throttle opening direction 42. Therefore, when the rotating frame 39 is driven to rotate in the throttle closing direction 43 by the grip-driving electric motor 37, the throttle grip 36, urged to rotate by the return spring 48, rotates in the throttle closing direction 43 while following the rotation of the rotating frame 39 so as to bring the arm portion 41 into abutment with the pressing piece 44. In other words, the rotating frame 39, which rotates coaxially with the throttle grip 36 by transmission of a power from the grip-driving electric motor 37, is mounted to the steering handle 35 so as to cause the throttle grip 36 to follow the rotation of the rotating frame 39.

A cancel switch 46, which detects when the throttle grip 36 is rotated in the throttle closing direction 43 with respect to the rotating frame 39, is mounted to the rotating frame 39. The cancel switch 46 is provided with a detection shaft 47. The detection shaft 47 is disposed within the rotating frame 39 so as to be facing toward and spaced apart from the pressing piece 44, and so as to be disposed on a side of the pressing piece 44 opposed to the side which faces the arm portion 41 of the throttle grip 36. In this manner, when the throttle grip 36 rotates toward the side of pressing the pressing piece 44 by the arm portion 41 and compresses the lost motion spring 45, that is, in the throttle closing direction 43, with respect to the rotating frame 39, then the pressing piece 44 comes into abutment with the detection shaft 47, and the cancel switch 46 functions to change the switching mode.

The amount of rotation of the throttle grip 36 is detected by a throttle operating amount sensor 49, and the throttle operating amount sensor 49 is mounted to the steering handle 35 together with the grip-driving electric motor 37 within the mounting member 38. The throttle operating amount sensor 49 and the inner end of the throttle grip 36 are connected, for example by a gear-type interlocking/connecting mechanism 50.

Figure 8:
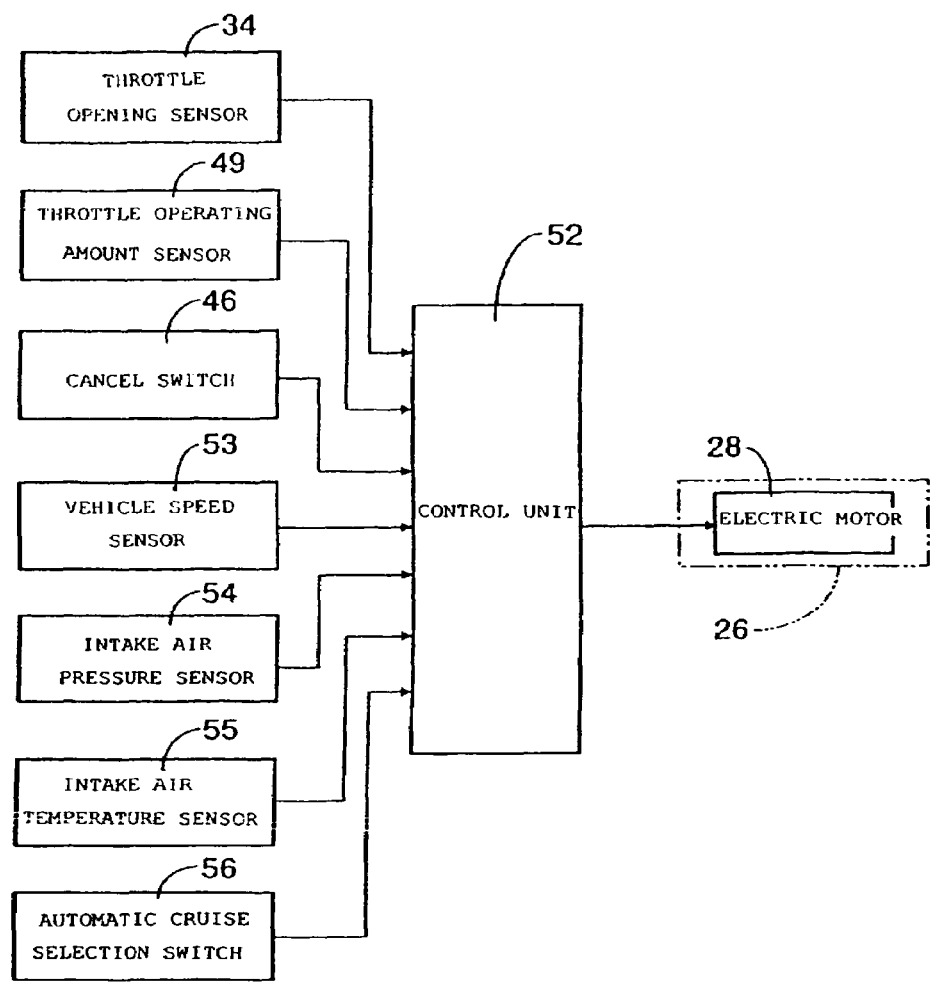
FIG. 8 is a block diagram of a throttle control system which controls the intake air control device of FIG. 1.

In FIG. 8, the movement of the valve shaft-driving electric motor 28 in the actuator 26 is controlled by a control unit 52, and a signal from the throttle opening sensor 34, the throttle operating amount sensor 49, the cancel switch 46, a vehicle speed sensor 53, an intake air pressure sensor 54, an intake air temperature sensor 55, and an automatic cruise selection switch 56 for switching the motorcycle between the automatic cruising state and the non automatic cruising state, are supplied to the control unit 52.

In this manner, when the automatic cruise selection switch 56 selects the non automatic cruising state, in response to the supply of the amount of rotation of the throttle grip 36 when the operator of the motorcycle rotates the throttle grip 36 from the throttle operating amount sensor 49, the control unit 52 controls the movement of the valve shaft-driving electric motor 28 so as to achieve the throttle opening according to the operating amount of the throttle.

When the automatic cruise selection switch 56 selects the automatic cruising state, the control unit 52 controls the movement of the valve shaft-driving electric motor 28 so as to control the throttle opening while considering the intake air pressure and the intake air temperature so as to maintain the vehicle speed obtained by the vehicle speed sensor 53 when the automatic cruise selection switch 56 is operated.

In such an automatic cruising state, when the vehicle operator rotates the throttle grip 36 in the throttle closing direction 43, the pressing piece 44 is pressed by the arm portion 41 against a spring force of the lost motion spring 45, and hence the detection shaft 47 is pressed by the pressing piece 44. Therefore, the switching mode of the cancel switch 46 is changed, whereby the control unit 52 releases the automatic cruising state according to the change of the switching mode.

The operation of this example will now be described. The vehicle body frame F includes the head pipe 11 at the front end thereof, and the pair of main frames 12 bifurcated from the head pipe 11 to the left and right and extending rearward. The actuator 26, including the valve shaft-driving electric motor 28, which can provide the power to rotate the valve shaft 24, is connected to the end of the valve shaft 24, which extends in the left and right direction of the vehicle body frame F and is rotatably supported by the air intake path forming body 18. The valve shaft-driving electric motor 28, having the axial line of rotation C2 which extends in parallel with the axial line C1 of the valve shaft 24, is arranged between the main frames 12 when viewing the motorcycle from above. Therefore, the valve shaft-driving electric motor 28, which constitutes a part of the actuator 26, can be protected since it is surrounded by the pair of main frames 12.

With the valve shaft-driving electric motor 28 arranged forwardly of the valve shaft 24 along the fore-and-aft direction of the motorcycle, the valve shaft-driving electric motor 28 is effectively cooled by wind generated during travel of the motorcycle, and generation of a performance deterioration phenomenon resulted from heat can be prevented so that the operability of the valve shaft-driving electric motor 28 can be increased.

In addition, the engine body 15, which includes a horizontally-opposed cylinder configuration, is mounted to the vehicle body frame F in an orientation in which the crank axial line CC extends along the fore-and-aft direction of the motorcycle. In addition, the axial line C1 of the valve shaft 24 and the axial line of rotation C2 of the electric motor 28 are arranged on the imaginary line SL arranged above the engine body 15, the line SL substantially in parallel to the crank axial line CC when the motorcycle is viewed from the lateral side. Therefore, the intake air control device is arranged in the vicinity of an upper surface of the engine body 15, and hence an air intake system can be reduced in size.

Since the grip-driving electric motor 37, which is moved by the amount of movement according to the amount of rotation of the valve shaft 24 in association with the movement of the actuator 26, is disposed on the steering handle 35 and is interlocked and connected to the throttle grip 36, a throttle cable is not required to achieve feeding back of the rotational movement of the valve shaft 24 driven by the valve shaft-driving electric motor 28 to the throttle grip 36, and hence laying of the throttle cable between a throttle drum mounted to the valve shaft and the throttle grip is not necessary.

The automatic cruise selection switch 56 permits switching between the automatic cruising state and the non automatic cruising state. In response to the selection of the automatic cruising state by the automatic cruise selection switch 56, the control unit 52 controls the movement of the valve shaft-driving electric motor 28 so as to maintain the vehicle speed at a constant value. Therefore, through selection of the automatic cruising state by the automatic cruise selection switch 56, the motorcycle can travel at a constant vehicle speed. In addition, the loading state of an internal combustion engine during the automatic cruising can be recognized by the rotation of the throttle grip 36, whereby a desirable feeling of travel can be obtained.

The rotating frame 39 rotates coaxially with the throttle grip 36 by the transmission of the power from the grip-driving electric motor 37, and is mounted to the steering handle 35 so as to cause the throttle grip 36 to follow the rotation of the rotating frame 39. The cancel switch 46, which detects that the throttle grip 36 is rotated in the throttle closing direction 43 with respect to the rotating frame 39, is mounted to the rotating frame 39. When the vehicle is operating in the automatic cruising state, the control unit 52 releases the automatic cruising state in response to detection of relative rotation of the throttle grip 36 in the throttle closing direction 43. Therefore the rotation of the throttle grip 36 for releasing the automatic cruising state can be detected by the cancel switch 46 in good response in the structure without the interposition of the cable or the like.

Although the example of the present invention has been described thus far, the present invention is not limited to the embodiment described above, and various modifications in design can be performed without departing from the invention stated in the Claims.

For example, the present invention can be widely implemented not only in motorcycles, but also in other types of saddle type vehicles, including, but not limited to, four-wheeled all-terrain vehicles and jet skis.

What is claimed, is:

1. A saddle type vehicle comprising an engine and a steering handle bar, the steering handle bar comprising:
   a bar shape;
   a throttle grip mounted to an end of the steering handle bar so as to be capable of turning relative to the steering handle bar; and
   a grip-driving electric motor disposed on the steering handle bar so as to be interlocked with and connected to the throttle grip,
   the engine comprising:
      an air intake path forming body that forms an air intake path;
      a valve shaft rotatably supported on the air intake path forming body;
      a butterfly-shaped throttle valve secured to the valve shaft, the valve controlling the size of the opening of the air intake path; and
      an actuator connected to an end of the valve shaft, the actuator comprising a valve shaft-driving electric motor which is moved in response to the turning operation of the throttle grip, the actuator being connected to an end of the valve shaft so as to rotate the valve shaft, and so that the rotational movement of the valve shaft is fed back to the throttle grip,
   wherein the grip-driving electric motor is moved by the amount of movement according to the amount of rotation of the valve shaft in response to the operation of the actuator.

2. The saddle type vehicle according to claim 1 comprising:
   an automatic cruise selection switch which permits switching between an automatic cruising state and a non-automatic cruising state, and
   a control unit which controls the movement of the valve shaft-driving electric motor so as to maintain a constant the vehicle speed in response to selection of the automatic cruising state by the automatic cruise selection switch.

3. The saddle type vehicle according to claim 2, the at least one steering handle bar further comprising:
   a rotating member that rotates coaxially with the throttle grip by transmission of power from the grip-driving electric motor, the rotating member being mounted to the steering handle so as to cause the throttle grip to follow the rotation of the rotating member, and
   a cancel switch mounted to the rotating member, the cancel switch detecting when the throttle grip is rotated in a throttle closing direction with respect to the rotating member,
   wherein when the vehicle is operating in the automatic cruising state, the control unit releases the automatic cruising state in response to detection by the cancel switch of the relative rotation of the throttle grip in the throttle closing direction.

4. The saddle type vehicle according to claim 2, further comprising:
   throttle opening sensor fixed to an end of the valve shaft and detecting an amount of rotation of the valve shaft;
   throttle operating amount sensor operatively connected to the throttle grip and detecting the amount of rotation of the throttle grip;
   an intake air pressure sensor which detects engine intake air pressure;
   an intake air temperature sensor which detects engine intake air temperature; and
   a vehicle speed sensor which detects vehicle speed,
   wherein a signal from the throttle opening sensor, the throttle operating amount sensor, the vehicle speed sensor, the intake air pressure sensor, the intake air temperature sensor, and the automatic cruise selection switch are supplied to the control unit,
   wherein when the automatic cruise selection switch selects the non automatic cruising state, and in response to the supply of the amount of rotation of the throttle grip when the operator of the motorcycle rotates the throttle grip from the throttle operating amount sensor, the control unit controls the movement of the valve shaft-driving electric motor so as to achieve the throttle opening according to the operating amount of the throttle.

5. The saddle type vehicle according to claim 1, wherein the steering handle bar further comprises a mounting member formed thereon, and the grip-driving electric motor is mounted to the steering handle via the mounting member so as to have an axial line of rotation in parallel with an axial line of rotation of the throttle grip.

6. The saddle type vehicle according to claim 1, wherein the steering handle bar further comprises a rotating frame and a transmission gear mechanism,
   the rotating frame is mounted to the steering handle so as to cover an inner end portion of the throttle grip, and
   the rotating frame is configured to be capable of rotating coaxially with the throttle grip, and is further configured so that the rotational power of the grip-driving electric motor is transmitted to the rotating frame via the transmission gear mechanism.

7. The saddle type vehicle according to claim 6 wherein the throttle grip is integrally provided with an arm portion, the arm portion projecting in a radially outward direction, and the arm portion being enclosed within the rotating frame, and
   a pressing piece is movably mounted to the rotating frame, the pressing piece configured to rotate the throttle grip in a throttle opening direction by coming into abutment with the arm portion.

8. The saddle type vehicle according to claim 7 wherein a recess is provided on an inner surface of the rotating frame, the recess permitting the rotational movement of the arm portion away from the pressing piece when the throttle grip is rotated in the throttle opening direction.

9. The saddle type vehicle according to claim 7 further comprising an automatic cruise selection switch which permits switching between an automatic cruising state and a non-automatic cruising state, a control unit which controls the movement of the valve shaft-driving electric motor so as to maintain a constant the vehicle speed in response to selection of the automatic cruising state by the automatic cruise selection switch, and a cancel switch which, when actuated, permits release of the automatic cruising state, the cancel switch mounted within the rotating frame adjacent to the pressing piece, wherein the pressing piece is spring-biased to rotate in a direction away from the cancel switch and in an opening direction of the throttle, and wherein the arm portion is configured to drive the pressing piece in a direction toward the cancel switch to an extent that the cancel switch is actuated, by means of a rotation of the throttle grip in a closing direction.

* * * * *